Figure 1:
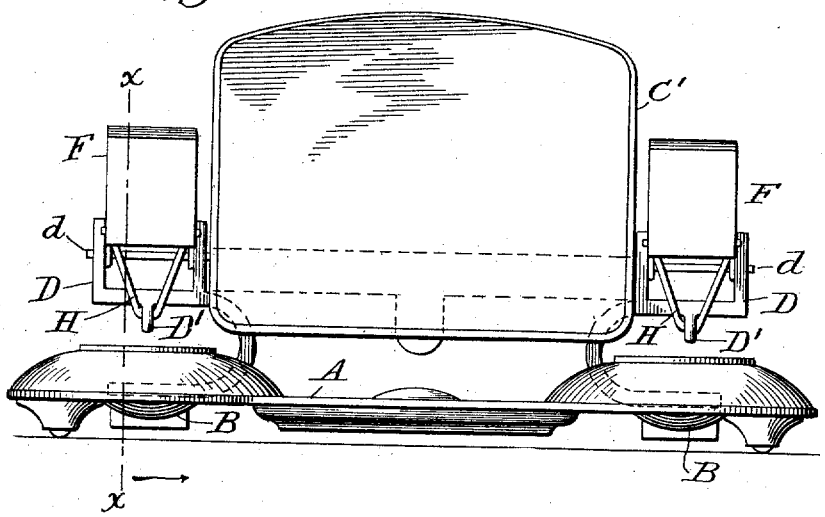

No. 12,487. REISSUED MAY 22, 1906.

E. WALKER.

CIGAR TIP CUTTER.

APPLICATION FILED APR. 23, 1904.

2 SHEETS—SHEET 1

Witnesses
James P. Duhamel,
V. E. Nichols.

Inventor
Edwin Walker,
By his Attorneys
Griffin Bernhardt & Cavanagh.

ANDREW B. GRAHAM CO., PHOTO-LITHOGRAPHERS, WASHINGTON, D. C.

No. 12,487. REISSUED MAY 22, 1906.

E. WALKER.

CIGAR TIP CUTTER.

APPLICATION FILED APR. 23, 1904.

2 SHEETS—SHEET 2.

Witnesses
James T. Duhamel
V. E. Nichols

Inventor
Edwin Walker,
By his Attorneys
Griffin Bernhardt & Cavanagh

ANDREW. B. GRAHAM CO., PHOTO-LITHOGRAPHERS, WASHINGTON, D. C.

UNITED STATES PATENT OFFICE.

EDWIN WALKER, OF ERIE, PENNSYLVANIA, ASSIGNOR TO THE BRUNHOFF MANUFACTURING COMPANY, OF CINCINNATI, OHIO.

CIGAR-TIP CUTTER.

No. 12,457. Specification of Reissued Letters Patent. Reissued May 22, 1906.

Original No. 753,941, dated March 8, 1904. Application for reissue filed April 23, 1904. Serial No. 204,652.

*To all whom it may concern:*

Be it known that I, EDWIN WALKER, a citizen of the United States, residing at Erie, in the county of Erie and State of Pennsylvania, have invented certain new and useful Improvements in Cigar-Tip Cutters; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to cigar-tip cutters, and has for its object the construction and arrangement of the parts of a cigar-tip cutter and the form thereof in such shape that it not only effectively performs the functions of a cigar-tip cutter, but also performs the functions of an advertising device supporting and displaying advertising matter as desired. To accomplish these results, I construct the frame of the machine so that one or more removable plates adapted to receive and display advertising matter can be secured thereto, and upon this frame I mount one or more cutter mechanisms consisting of a cutter-arm pivoted at one end to the frame provided with a cutter-blade at its opposite end and with a spring adapted to support it in its normal position, and upon the same axis I pivot another arm, to the opposite end of which I pivot the upper part of a hollow cutter-head provided with the usual openings for cigar-tips on the top thereof, and in the lower part of the cutter-head there is pivoted another arm, the opposite end of which is pivoted to the frame below the plane of the axes of the other arms hereinbefore referred to, so that when the cutter-head is depressed it will move downward in substantially a vertical position, and when a cigar-tip is inserted into one of the holes in the head and pressed downward the pressure acting on the spring supporting the cutter-arm operates to bring the edge of the cutter-blade against the inner surface of the top of the head and retain it in this position during the downward movement of the head, and thereby insure a close shear of the blade past the holes in the cutter-head regardless of the wear on the blade.

The features of my invention are hereinafter fully set forth and described, and illustrated in the accompanying drawings, in which—

Figure 2:
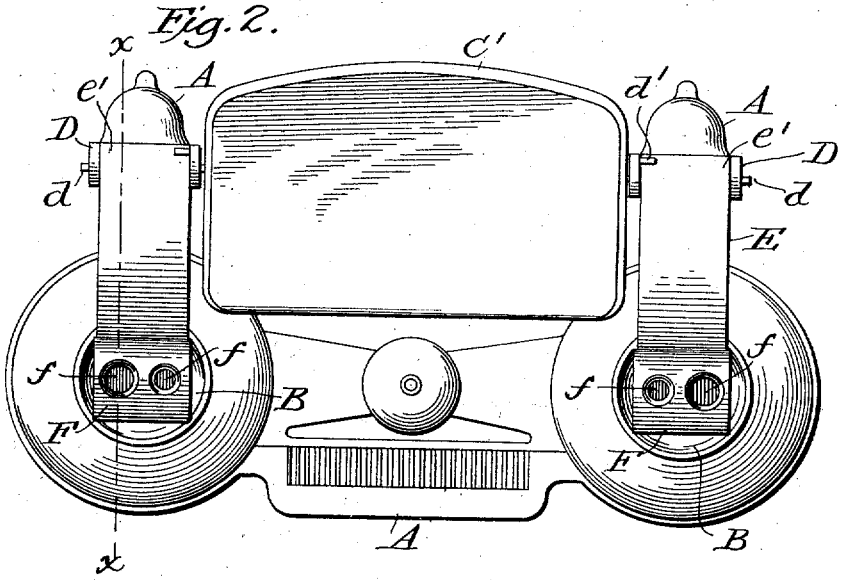
Figure 3:
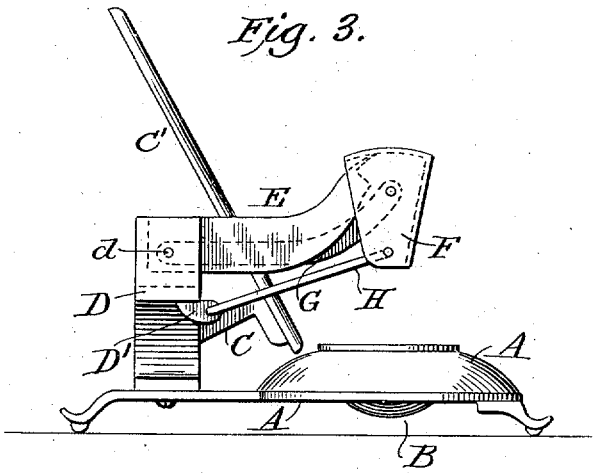
Figure 4:
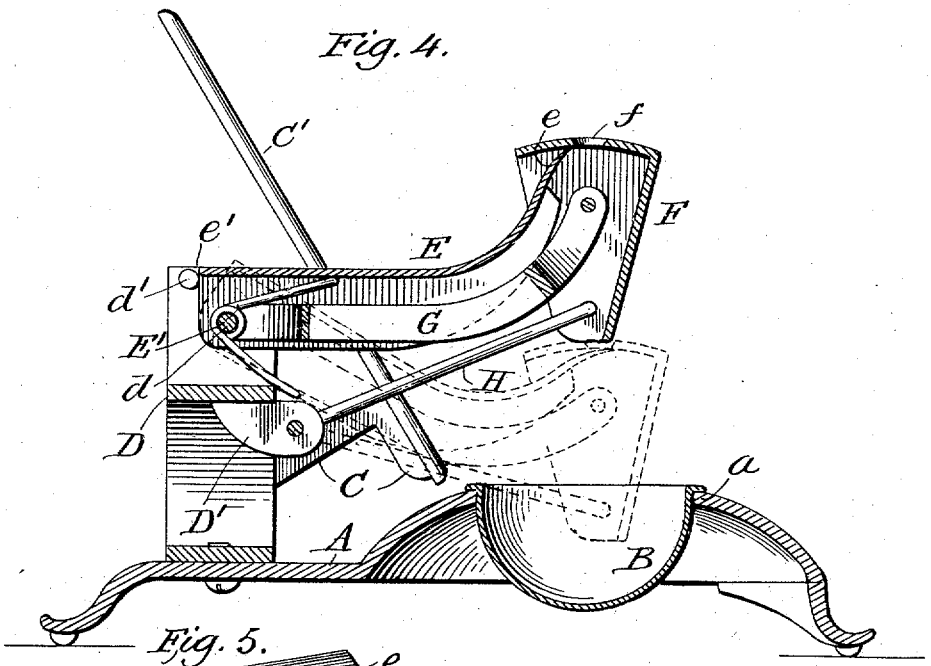
Figure 5:
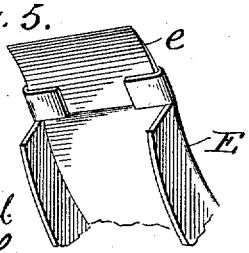

Figure 1 is a front view in elevation of one form of my improved cigar-tip cutter. Fig. 2 is a top or plan view of the same. Fig. 3 is an end view in elevation of the same. Fig. 4 is an enlarged transverse section of the same on the line *x x* in Figs. 1 and 2. Fig. 5 is a detail perspective view of a part of the cutter-arm, showing a cutter-blade secured thereto.

In the drawings illustrating this form of my improved cigar-tip cutter, A is the base of the frame, provided with openings *a* at the sides of the front thereof for the reception and support of removable cups B. Secured at the side of each rear corner of the base A there is an upright D, and between said uprights there is a support C, which is adapted to receive and support a removable plate C′, suitable to present and display advertising matter.

On each of the uprights D, I pivot one end of a cutter-arm E on a pintle *d*, the opposite end of which arm curves upward and has secured thereto a cutter-blade *e*, the pivoted end of which arm E is also provided with a shoulder *e′*, which engages a stop *d′* on the upright D when in its normal position, in which position it is yieldingly supported by means of a spring E′. On the pintle *d* I also pivot one end of an arm G, the opposite end of which curves upward and is pivoted in the sides of a hollow cutter-head F, the front, top, and sides of which are preferably closed. In the top of the head F, I make one or more cigar-tip openings *f*. Pivoted in the lower part of the head F there are other arms H, which extend back to and are pivoted in lugs D′ on the uprights D below the place of the pintle *d* therein. The blade *e* on the arm E extends into the head F far enough so that when the head and arms are in their normal positions, as illustrated in Figs. 3 and 4, the edge of the blade *e* is back of the openings *f* in the head; but as the head is moved downward the blade *e* moves across the openings *f* in the head until the edge thereof passes said openings, as illustrated in dotted lines in Fig. 4. It will be observed that the spring E′ acting on the arm E operates to retain the edge of the blade *e* in contact with the inside of the top of the head F, and when pressure is exerted on the top of the head—say, for example, by inserting a cigar-tip into one of the openings *f* therein and pressing downward upon it—it forces the head down into close contact with the edge of the blade *e*, and as the head moves downward it continues this close contact, so as to effectually shear off that portion of the cigar-tip projecting below the hole *f*. This feature enables me to avoid the necessity of an accurate adjustment of the edge of the blade *e* with relation to the inside surface of the head F, as the spring E′ operates on the arm E at all times to force the blade *e* into close contact with the inside surface of the head in opposition to any pressure applied thereon to depress it.

My improved construction and arrangement of parts possess the following practical advantages, to wit: First, the cutter-head F has a traversing movement relative to the cutter-blade *e*, imparted thereto on the up-and-down movement of the three arms E, G, and H, the cutter-head F, and the blade *e* when a cigar-tip is thrust into one of the openings *f* and pressure is applied downwardly on the cigar; second, the arm H may be disconnected from the cutter-head and the latter slipped out of position with relation to the cutter-blade *e*, thus allowing the arms G H and the cutter-head F to be dropped downwardly, so as to expose the blade *e* for readily sharpening the same, and, third, the hollow form of the cutter-head serves to confine the cigar-clippings within the walls of the head, thus making them descend by gravity into the cup B provided for their reception.

By reference to Figs. 2 and 4 of the drawings it will be noted that the cutter-head F is arranged to cover or inclose within itself the cutter *e* and that said head has pivotal connection with the arms G H, while it is not attached to cutter-arm E. The traversing movement of the cutter-head with relation to the blade *e* is secured in the construction shown by the drawings by making the arm H somewhat shorter than the arm G and by pivoting said arm H to the lugs D′ on the frame or support at a different point from the pivot of the arm G, said arm H being also connected detachably and pivotally to the cutter-head at a point some distance from the pivot which connects the arm G to the head F. On the downward movement of the parts the cutter-head is turned on its pivotal connection with the arm G by the operation of the arm H, which swings on a different center from that of the arms E G, whereby the apertured top plate of the cutter-head is moved across the blade *e*. The arms E G and the arm H, which actuate the blade *e* and the cutter-head, are so arranged that they serve to make the top plate of the cutter-head E and the blade *e* move in opposite directions one to the other on descent of the parts, so that the parts of the cutter mechanism have a shearing effect on the cigar-tip which is thrust into one of the apertures *f*, and thus cutting said tip easily and cleanly. It will be apparent that when the arms are depressed the knife-edge and the outer edges of the apertures in the cutter-head approach each other, and as the depressing movement continues the shearing cut is effected. It will furthermore be noted that the arm E is pressed to its raised position by the spring E′, while the arms G H are not spring-actuated, but are pivoted simply to the frame and the cutter-head. The cutter-head is held in its raised position by arranging it over the blade *e* on the spring-actuated arm E, and said cutter-head in turn holds the arms G H in their raised positions, whereby a single spring E′ acts to maintain all the operating parts in their raised normal position.

The arm H is shown by Figs. 1, 3, and 4 as a wire bail having the ends of its members provided with pintles which are fitted loosely in openings of the cutter-head, thus detachably and pivotally connecting the arm and the cutter-head. The members of this wire arm may be pressed toward each other in order to disconnect the arm from the cutter-head, and when thus disconnected the cutter-head may be turned for its apertured top plate to clear the cutter *e*, whereby the arms G H and the cutter-head may be dropped out of position, and thus expose the blade *e* to ready access for the purpose of sharpening it.

The cutter-head F is shown as consisting of parallel sides, a front wall, and a curved top plate having the openings *f*, thus leaving the inner or rear side of the cutter-head open for the reception of the arms E G H. The hollow form of the cutter-head is advantageous, because it confines the cigar-clippings within its walls and prevents the clippings from flying out when severed from the end of the cigar, whereby the clippings are free to gravitate into a cuttings-receptacle.

I have shown and described a convenient construction and arrangement of parts of my improved cigar-tip cutter to enable others to construct and utilize the same; but it is obvious that many modifications can be made therein without departing from the spirit of my invention.

Therefore what I claim as new, and desire to secure by Letters Patent of the United States, is—

1. The combination in a cigar-tip cutter, of a frame, a pair of arms pivoted thereto one above the other, a hollow cutter-head pivoted to the free ends of said arms, a cutter within said hollow cutter-head, a cutter-arm pivoted to said frame and connected with said cutter for operating the same, and a spring operating to raise the cutter-head, substantially as set forth.

2. The combination in a cigar-tip cutter, of a frame, a pair of arms pivoted thereto, one above the other, a hollow cutter-head pivoted to the free ends of said arms, a cutter-arm pivoted to said frame and operating a cutter-blade under the top of the cutter-head, and a spring operating on one or more of said arms to raise and yieldingly support the cutter-head, substantially as set forth.

3. The combination in a cigar-tip cutter, of a frame, an arm pivoted to said frame having its outer end curved upward, another arm pivoted to said frame below the first-named arm, a hollow head pivoted to the outer ends of said arms, a cutter-arm pivoted to the frame on the same axis as the upper arm above referred to, and having its outer end curved upward under the top of the hollow head, a cutter-blade on the end of said arm, and a spring operating on said cutter-arm, substantially as set forth.

4. The combination in a cigar-tip cutter, of a frame having an advertising-display plate thereon, an upright on said frame, a pair of arms pivoted therein one above the other, a hollow head having cigar-tip openings therein pivoted to the outer ends of said arms, a cutter-arm pivoted to the frame on a common axis with the upper one of the arms pivoted in the hollow head, a stop on the upright engaging said cutter-arm so as to limit its upward movement, a spring operating on said cutter-arm to normally support it in a raised position, and a cutting-blade on the free end of the cutter-arm under the inside of the top of the cutter-head adapted to closely contact therewith when downward pressure is applied to said head, substantially as set forth.

5. A cigar-cutter having a cutting device consisting of two members, one of which is a cutting member and the other is a cutting-head with a tip-opening, swinging arms for supporting the cutter-device members in coöperative relation and permitting them to have an up-and-down movement, and operating to impart to both of said members a bodily movement toward and away from each other.

6. A cigar-cutter having a plurality of pivoted arms, a blade, and a cutter-head, the latter being supported by one of said arms and actuated by another of the arms to have a traversing movement relative to the blade.

7. A cigar-cutter having a cutter-head provided with a tip-opening, a blade, and a plurality of swinging arms arranged to support the blade and cutter-head in coöperative relation and operating to simultaneously move the cutter-head and the blade in opposite directions.

8. A cigar-cutter having a plurality of arms mounted to swing on different centers, a blade operated by one of said arms, and a cutter-head pivoted to other arms and actuated thereby to have a traversing movement relative to the blade.

9. A cigar-cutter having two arms, a cutter-head pivoted thereto, a third arm, and a cutter-blade actuated by said third arm.

10. A cigar-cutter having three arms, a blade operated by one of said arms, and a cutter-head pivoted to certain of the arms and coöperating with the blade, one of the arms being effective in giving a traversing movement to the cutter-head relative to the blade.

11. A cigar-cutter having a spring-actuated arm, a cutter operated by said arm, a cutter-head coöperating with said cutter, and other arms swinging on centers in different axial alinement and connected with said cutter-head for imparting movement thereto.

12. A cigar-cutter having an arm, a blade adapted to be operated thereby, a cutter-head operatively related to the blade, other arms swinging on different centers from each other and pivoted to the cutter-head, and means for holding said parts normally in raised positions.

13. A cigar-cutter having three arms, a cutter operated by one of said arms, and a cutter-head pivoted to two of said arms, said cutter-head being detachably connected to one of said arms and removably fitted to the cutter.

14. A cigar-cutter having two arms mounted to swing on the same center, a blade operated by one arm, a cutter-head pivoted to the other arm, and a third arm turning on a different center and connected to the cutter-head.

15. A cigar-cutter having two arms mounted to swing on a common axis, a blade operated by one arm, a cutter-head pivoted to the other arm and coöperating with the blade, a third arm mounted for movement on a different center and connected detachably to the cutter-head, and means for holding all the parts normally in a raised position.

16. A cigar-cutter having two arms mounted for movement on a common axis, a blade operated by one arm, a hollow cutter-head pivoted to the other arm, said cutter-head being closed on three sides and having an apertured top plate, and a third arm swinging on different center from the two first-named arms and pivoted to the cutter-head.

17. A cigar-cutter having a plurality of pivoted arms, a cutter-head pivoted to said arms, cutting mechanism, and means separate from said pivoted arms for operating said cutting mechanism.

18. In a cigar-cutter, a pivoted cutter-head, a cutting-blade, and pivoted members adapted when operated to cause the said cutter-head and cutting-blade to approach toward and recede from each other.

In testimony whereof I affix my signature in presence of two witnesses.

EDWIN WALKER.

Witnesses:

JAS. H. GRIFFIN,

RICHARD B. CAVANAGH.